United States Patent [19]

Eltgen

[11] 4,449,133

[45] May 15, 1984

[54] PROCESS AND MACHINE FOR MAGNETOGRAPHIC PRINTING (IV)

[75] Inventor: Jean-Jacques Eltgen, Danjoutin, France

[73] Assignee: Compagnie Internationale pour L'Informatique Cii-Honeywell Bull, Paris, France

[21] Appl. No.: 380,406

[22] Filed: May 20, 1982

[30] Foreign Application Priority Data

Dec. 23, 1981 [FR] France ............................... 81 24060

[51] Int. Cl.$^3$ ............................................... G01D 15/12

[52] U.S. Cl. ...................................... 346/74.7; 430/39; 430/42

[58] Field of Search ....................... 346/74.7, 74.4, 1.1; 358/301; 430/39, 42, 45, 47

[56] References Cited

U.S. PATENT DOCUMENTS 3,824,601 7/1974 Garland et al. .................... 346/74.4

4,126,494 11/1978 Imamura et al. ................. 148/31.57

*Primary Examiner*—Thomas H. Tarcza

*Attorney, Agent, or Firm*—Kerkam, Stowell, Kondracki & Clarke

[57] ABSTRACT

The invention relates to a magnetographic printing process as well as to a machine which enables the production of images in two colors on a print carrier. The machine which carries out said process comprises magnetic heads (13-1 . . . , 13-n) energized by impulses emitted by a pulse generator (26) by means of a current calibrating and reversing device (27) in order to selectively produce on the drum (10) magnetized points having magnetizations of different direction and amplitude, pigment applicator means (40, 42), retouching devices (41, 43) and a transfer station (45) where the pigments deposited onto the drum (10) are transferred to a paper strip (20). The magnetized points designed to produce on the carrier images or parts thereof which must appear in one of said colors all have magnetization intensities of the same amplitude ($J_1$) and in the same direction and a magnetic polarity which is opposite that of other magnetized points all having magnetization intensities of the same amplitude ($J_2$), $J_2 < J_1$.

8 Claims, 12 Drawing Figures

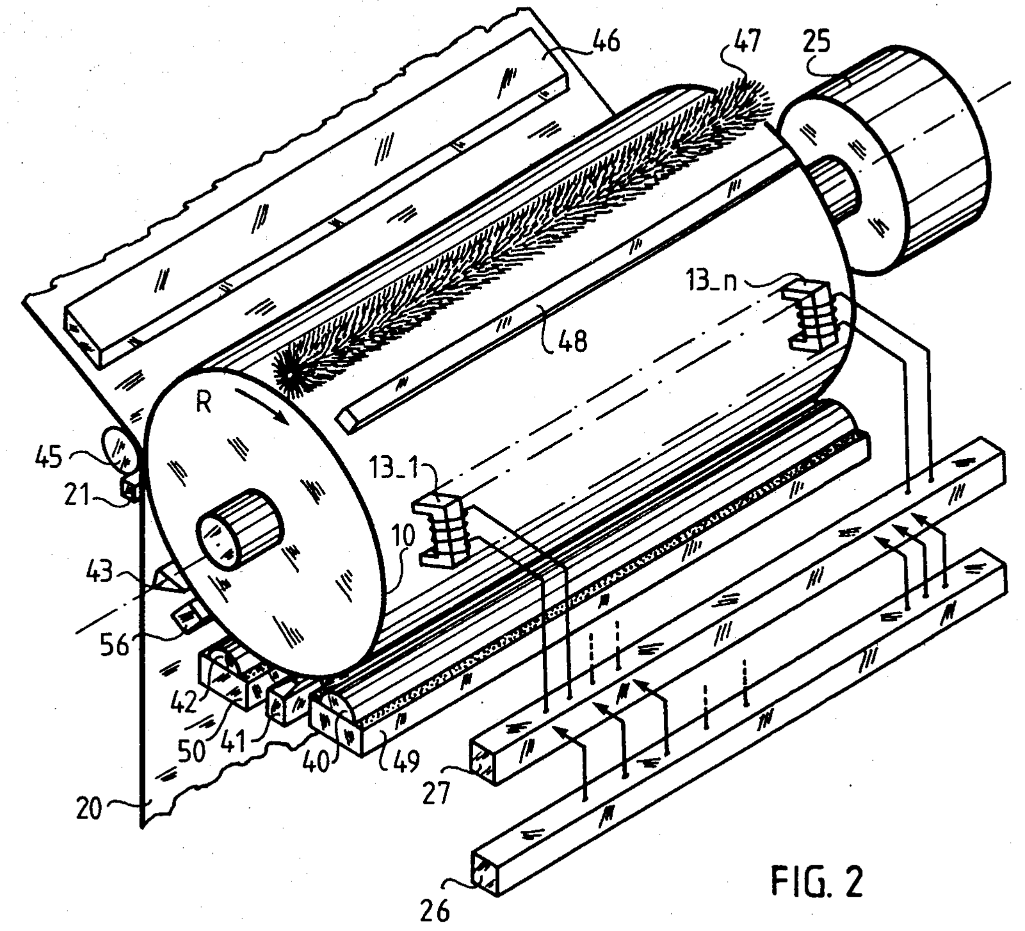
FIG. 2
FIG. 3
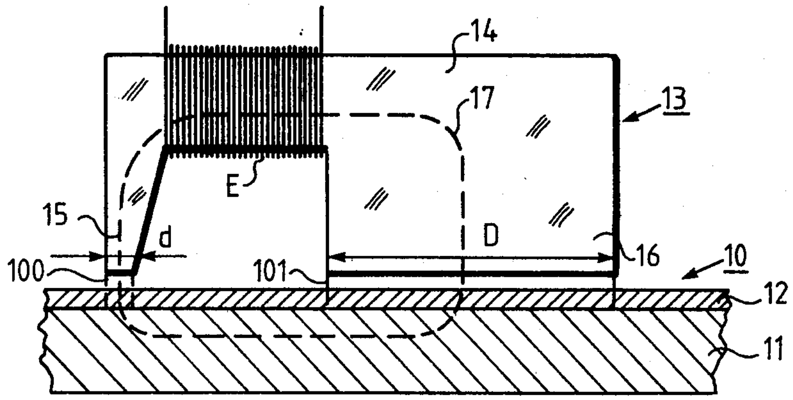

PROCESS AND MACHINE FOR MAGNETOGRAPHIC PRINTING (IV)

CROSS REFERENCE TO RELATED APPLICATIONS

The magnetographic printing process described herein is one of four related approaches developed by applicant which enable the production of color images on a print carrier. The other aproaches are described and claimed in the following concurrently filed U.S. applications for patent:

Approach I—Ser. No. 380,356; filed May 20, 1982; Process and Machine for Magnetographic Printing (I); J. G. Magnenet; corresponding to Fr. No. 81.24055, filed Dec. 23, 1981.

Approach II—Ser. No. 380,404; filed May 20, 1982; Process and Machine for Magnetographic Printing (II); J. G. Magnenet; corresponding to Fr. No. 81.24055, filed Dec. 23, 1981.

Approach III—Ser. No. 380,358; filed May 20, 1982; Process and Machine for Magnetographic Printing (III); J. G. Magnenet; corresponding to Fr. No. 81.24059, filed Dec. 23, 1981.

BACKGROUND OF THE INVENTION

1. Field of the Invention

The present invention relates to a magnetographic printing process which enables the production of images in color on a print carrier, and a machine for carrying out the process.

2. Description of the Prior Art

Magnetographic printing machines which, in response to signals received, which originate from a control unit, enable images, e.g., character images, to be produced on a print carrier generally consisting of a paper strip or sheet are known to those skilled in the art. In such printing machines, which may be of a type similar to that described in French Patent Application No. 2,305,764, corresponding to U.S. Pat. No. 3,945,343 the images are printed, first, by producing from the signals received a latent magnetic image on the surface of a magnetic recording element. The recording element generally is in the shape of a rotating drum or endless belt. The image consists of a group of magnetized zones of very small dimensions. This latent image is then developed by depositing on this surface a powdery developer containing magnetic particles, which remain applied only to the magnetized zones of the recording element so as to produce a powdery image on the surface of that element. Thereupon, the powdery image is transferred to the print carrier.

For certain special applications it may be desirable for the image thus produced to appear on the print carrier in several different colors. In a previously known process, more particularly as described in French Pat. No. 1,053,634, corresponding to U.S. application Ser. No. 221,044, now U.S. Pat. No. 2,826,634 of M. Ralph Blaisdell Atkinson, filed Aug. 14, 1951, a color image is printed on the print carrier by, first, producing on the recording element a latent magnetic image corresponding to the portions of the same color of the image to be printed, developing this latent image by means of a developer of the same color, transferring onto the print carrier the powdery image thus obtained, and repeating this operation as many times as there are colors in the image to be printed. Such a process, however, is obviously inconvenient because it takes a very long time to carry it out. Furthermore, despite all the care taken in centering the various powdery images during their transfer onto the print carrier, it is virtually impossible to prevent shiftings, however slight, from occurring between the different parts of the image thus printed which, of course, deleteriously affects the definit on of the image eventually produced on the print carrier.

To overcome the above drawbacks, a magnetographic printing process has been proposed, which is described in U.S. Pat. No. 3,965,478. It consists of producing on the surface of the recording element a large number of magnetized elementary zones, all of which produce a latent magnetic image. Each of these elementary zones is obtained by energizing a recording magnetic head by means of an electric current having a frequency which is selected as a function of the color to be produced by this elementary zone when it is developed. The dimensions and the magnetic attraction of this elementary zone are, moreover, determined by the value of the frequency employed. In this process, the development of the latent image formed on the recording element is accomplished by means of a single developer containing particles of different colors and sizes. All particles of the same size are, however, of the same color. During the development of the latent image, the particles of a given size (and, hence, of a given color) are attracted preferentially by the elementary zones, whose dimensions correspond to a given attractive force so that each elementary zone, after the development, is coated with particles whose color corresponds to the frequency that has been used to produce that elementary zone.

In order to carry out such a process, it is, however, necessary to use a developer whose particles of different colors and different sizes must be carefully calibrated, with all the particles of the same color being exactly of the same size. In addition, these particles must be so conditioned that they do not agglomerate, lest they cause errors in color shades during the development of the magnetic latent image. Under these conditions, the fabrication of such a developer is particularly time-consuming, delicate, and relatively expensive. Furthermore, since, the elementary zones formed on the recording element are not all of the same size, depending on the color assigned to them, the images or parts thereof with a shade corresponding to elementary zones of large dimensions produce a definition, i.e., a distinctness of outline and detail, not as good as those whose shade corresponds to elementary zones of small dimensions. Finally, while during the development the elementary zones of small dimensions are capable of attracting only the smallest particles of the developer, it is impossible to prevent the elementary zones of large dimensions from attracting not only the large particles of the developer, but also smaller particles, which, of course, causes the colors to change.

SUMMARY OF THE INVENTION

The present invention overcomes these disadvantages and proposes a magnetographic printing process, as well as a machine for carrying gut this process and allows one to obtain on a print carrier and in a relatively short time high-quality color images, while requiring only developers that exhibit the same granulometric state and the same magnetic characteristics.

The invention relates to a magnetograhic printing process which consists in magnetizing the surface of a magnetic recording element in a direction perpendicular thereto so as to produce a group of magnetized points which form a latent magnetic image, then depositing onto said surface a powdery developer designed to be applied only to the magnetized points of said surface and thus form a powder image and, finally, transferring said powder image to a print carrier, said process being characterized in that in order to make it possible to obtain on said carrier an image in two preselected colors. More particularly, the process consists in the steps of:

First, magnetizing the surface of the recording element so as to produce magnetized points, having magnetization intensities of different amplitudes and of opposite magnetic polarities, the magnetized points designed to produce parts of images which, on the carrier, must appear in one of said colors all having magnetization intensities of the same amplitude $J_1$ and oriented in the same direction, the magnetic polarity of said points being opposite to that of the other magnetized points, said other magnetized points all having magnetization intensities of the same amplitude $J_2$, such that $J_2 < J_1$;

then, depositing on said surface a first powdery developer whose shade is that of the first of said colors;

eliminating said first developer from said surface, with the exception of the magnetized points whose magnetization intensity is equal to $J_1$;

depositing on said surface a second powdery developer whose shade is that of the second of said colors;

eliminating partially said second developer from said surface, while subjecting the latter to the action of a constant magnetic field oriented in a direction opposite to the magnetization intensity $J_1$, the value of the amplitude of said magnetic field being such that the magnetization intensities of the magnetized points are modified and assume practically the same value, so that said second developer is eliminated from said surface, with the exception of the magnetized points whose magnetization intensity is equal to $J_2$, each of the latter points thus being coated with a single layer of said second developer, while each of the other magnetized points is coated with a single layer of said first developer; and finally, effecting a transfer of said developer layers onto the print carrier.

The invention also relates to a magnetographic printing machine for carrying out the above mentioned process. This machine comprises a recording element provided with a magnetic recording surface, a plurality of magnetic heads controlled by electric pulses and designed to magnetize said recording surface in response to said pulses in a direction perpendicular to said surface so as to produce thereon a group of magnetized points which form a latent magnetic image, drive means for bringing about a relative displacement between the recording element and the magnetic heads, a pulse generator designed to emit electrical pulses selectively to said heads, and an applicator means to enable a powdery developer to be deposited onto said recording surface, the developer remaining applied only to the magnetized points of the surface to produce a powder image, and a transfer station to transfer said powder image to a print carrier, the machine being characterized in that, the developer includes particles whose shade is one of the two preselected colors, and also comprises:

electric current calibrating and reversing means inserted between the magnetic heads and the pulse generator in order, on the one hand, to selectively reverse the current direction of the impulses transmitted by said generator and, on the other, to allow each of said impulses to be adjusted selectively to one of the two values of predetermined amplitude and thus to produce on the recording surface a latent magnetic image whose magnetized points exhibit magnetization intensities of different amplitudes and of opposite magnetic polarities, the magnetized points designed to produce images or parts thereof which, on the carrier, must appear in one of said colors all having magnetization intensities of the same amplitude $J_1$ and in the same direction, the magnetic polarity of said points being opposite to that of the other magnetized points, said other magnetized points all having magnetization intensities of the same amplitude $J_2$, such that $J_2 < J_1$;

(p−1) retouching means, each fitted downstream, in relation to the direction surface displacement, to each of said applicator means, said retouching means being designed so as to remove the first developer from the magnetized points whose intensity of magnetization is less than $J_1$;

a second applicator means located between the transfer station and the first applicator means for depositing a second powdery developer onto said recording surface, said second developer containing particles whose shade is that of the other of said colors, said second developer remaining applied only to the magnetized points of said surface; and a second retouching means downstream of said second applicator means and comprising a magnetic field generator to apply a constant magnetic field to said recording surface, said field being oriented in a direction opposite to the magnetization intensity $J_1$, the amplitude of said field being designed to modify the amplitudes of the magnetization intensities of the magnetized points and to render them practically equal when said magnetized points move past said second retouching means so that, after said passage, each of the magnetized points, whose magnetization intensity was equal to $J_2$, is coated with a single layer of the second developer, while each of the magnetized points, whose magnetization intensity was equal to $J_1$, is coated with a single layer of the first developer, both developers thus forming a powder image in two colors on the recording surface.

BRIEF DESCRIPTION OF THE DRAWINGS

Other features and advantages of the invention will be more readily understood from the consideration of the ensuing description offered by way of non-limitative example, and from the accompanying drawings, in which:

FIG. 2 shows an embodiment of a printing machine for implementing the printing process of the invention;

FIG. 3 is a view showing the principle of transverse magnetization of the recording element forming part of the machine of FIG. 2;

DESCRIPTION OF THE PREFERRED EMBODIMENTS

Figures 1A, 1B, 1C, 1D, 1E, 1F:
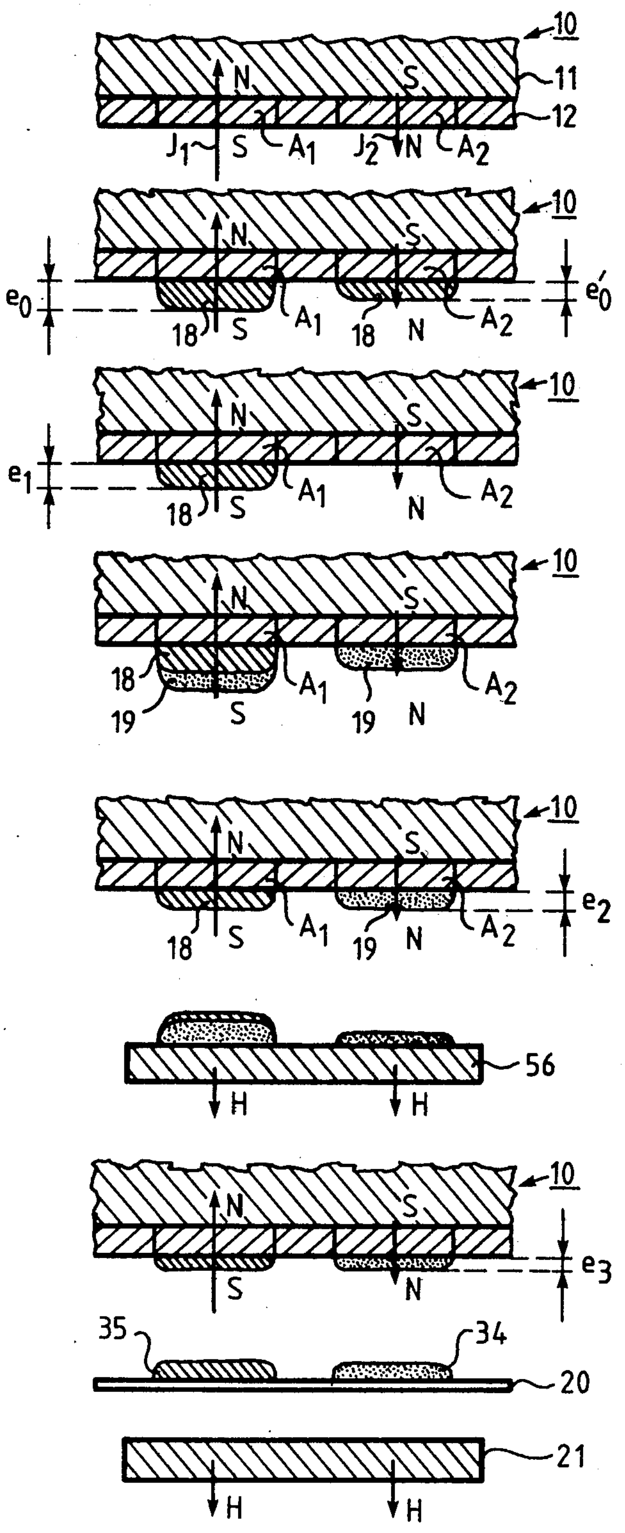
FIG. 1A through 1F show the various phases of the magnetographic printing process according to the invention.

FIG. 1A shows, in an enlarged section, a known type of recording element (10) which can be used for carrying out the process of the invention. It is assumed in the example being described that this magnetic recording element is of a type similar to that described and shown in French Pat. No. 2,402,921 corresponding to U.S. Pat. No. 4,205,120 and that it comprises a carrier (11) composed of a material with a high magnetic permeability such as iron or mild steel, said carrier being coated with a layer of highly coercive magnetic material such as, for example, a nickel-cobalt magnetic alloy. In the method for implementing the printing process of the invention, this recording element (10) is magnetized transversely by means of one or several recording heads (13) of the same type as that shown in FIG. 3.

Now, referring to FIG. 3, it can be seen that this recording head (13) includes a magnetic core (14) around which is wound a winding (E) connected to an electrical excitation circuit, which will be described later. This magnetic core (14) is substantially U-shaped and has a profile such that it has at its opposite ends a recording pole (15) and a flux-shutoff pole (16). As can be seen in FIG. 3, these two poles are located near the surface of the magnetic layer (12) so that a closed magnetic circuit is formed by the carrier (11) and the two areas (100) and (101) enclosed by said core and said carrier located plumb against the poles (15) and (16), respectively. It should be noted here that, although in the case illustrated in FIG. 3, the poles (15) and (16) are located near the surface of the magnetic layer (12), a different arrangement could be used in which these two poles would be placed in direct contact with said surface.

FIG. 3 also shows that the width (d) of the recording pole (15) is very small in relation to the width (D) of the flux-shutoff pole (16). Under these conditions, if an electric current with an intensity (I) flows through the coil, this current generates inside the magnetic core (14) a magnetic flux whose mean force line is represented by a broken line (17). In the portion of the magnetic layer (12) located in the area (100) of the recording pole (15), the magnetic field is perpendicular to the surface of said layer (12), so that in this portion the magnetization of the magnetic layer (12) does occur transversely. In this portion, the magnetic field generated by the head (13) is greater than the saturation field of the magnetic layer (12) and, therefore, causes the appearance in said portion of a practically pinpoint magnetized zone, usually termed a magnetized point, said magnetized zone continuing to exist even if no more current flows through the coil (E). On the contrary, in the portion of the magnetic layer (12) located in the area (101) of the flux-shutoff pole (16), because the width of said pole is much greater than that of the recording pole (15), the value of the magnetic field generated by the head (13) is much lower than that of the saturation field of the magnetic layer (12), so that the flux-shutoff pole (16) can cause neither the formation of a magnetized zone in the layer (12) nor a modification of the magnetized zones already formed in said layer. Under these conditions, it is possible to magnetize the magnetic layer (12) so that the magnetized zones thus formed form a latent magnetic image with a given configuration, e.g., the configuration of a character. As an example, in FIG. 5 a group of magnetized zones A is shown arranged as a rectangular matrix with seven lines and five columns, and distributed within said matrix so as to form the image of the character "H".

It should be, noted that the spacing pitch (P) for the lines and columns of this matrix is at least equal to the dimension (L) of a magnetized zone. Under these conditions, it has been found that even in the case where this pitch (P) was substantially equal to said dimension (L), the magnetizations exhibited by two adjacent magnetized zones had practically no influence on each other. It will be recalled that in previously known processes the latent magnetic image which has thus been produced on the surface of the recording element is then developed by depositing on the surface of the magnetic layer (12) a powdery developer containing finely divided particles, each consisting of a thermoplastic organic resin in which a pigment and some magnetic particles have been incorporated. Thereupon, the surface of the magnetic layer (12) is subjected to a retouching operation which enables the elimination of the developer particles which are in excess on said surface, so that at the end of the operation only the magnetic zones of said layer remain coated with a developer film, thus forming on the surface of the layer (12) a powder image whose configuration corresponds to that of the magnetized zones. This powder image is then transferred to a print carrier usually consisting of a paper strip. In the present invention, on the contrary, in order for the image produced on the print carrier to appear in one and/or the other of the two preselected colors, the following process is used, the various phases of which will now be described with reference to FIG. 1A through 1E.

In the phase shown in FIG. 1A, the recording element (10) is magnetized so as to produce on its surface magnetized zones, all of which are of the same size and have magnetization intensities of different amplitudes and of opposite magnatic polarities. In FIG. 1A, only two of these zones, designated, A1 and A2, have been shown for the sake of simplicity, but it will be understood that the number of these magnetized zones can be absolutely anything, subject only to the physical constraints of the apparatus. FIG. 1A likewise shows the magnetic polarities north (N) and south (S), as well as the respective magnetizations $J_1$ and $J_2$ of the zones A1 and A2, each of said magnetizations being indicated by an arrow having a length which is proportional to the value of said magnetization. It can be seen in FIG. 1A that all the magnetizations $J_1$ and $J_2$ of the respective zones A1 and A2 have different values and are oriented in opposite directions, so that the south (S) magnetic polarity exhibited by the zone A1 on the surface of the recording element (10) is opposite to the north (N) magnetic polarity exhibited by the zone A2 on that same surface.

In the example described in FIG. 1A, it can also be seen that the magnetization $J_1$ of the zones A1 is greater than the magnetization $J_2$ of the zone A2. Generally, the magnetized zones intended to produce on the print carrier images or parts of images which must appear in one of the two selected colors magnetizations all of which have the same value $J_1$ and all being oriented in the same direction. However, the magnetization of these zones is oriented in a direction opposite to that of the magnetizations of the other magnetized zones designed to produce on said carrier images or parts of images which must appear in the other color. The magnetizations of these other zones are all equal to $J_2$, which is different from $J_1$. Thus, the zones A1 and A2 shown in FIG. 1A with magnetizations of different values and opposite directions are intended to produce on the printing paper two pinpoint spots of different colors. It is assumed, however, for example, that the magnetized zone A1 is intended to produce a red pinpoint spot and te magnetized zone A2 is designed to produce a black pinpoint spot. In order to produce the two magnetized zones A1 and A2, two identical recording heads of the type shown in FIG. 3 can be employed and energized with currents of different intensities, but such that the direction in which the current flows through the winding of the first head is opposite to that in which it flows through the winding of the second head.

After the recording element has been magnetized in the manner described above, a first powdery developer having a shade which is one of the previously selected p colors is deposited on the surface of said element. In the example being described, it is assumed that the color of the first powdery developer is red.

The first developer, which is brought into contact with the entire surface of the recording element (10), is only attracted by the magnetized zones of said element, so that this developer is allowed to exist only on these magnetized zones, e.g., by depositing the developer on the recording element in such a way that at the time the developer is applied to said element, each developer particle is subjected on the one hand, to the action of the magnetic attractive force exerted by the magnetized zones and, on the other, by a gravitational force oriented in a direction opposite to that of the magnetic attraction force exerted by the magnetized zones. Each of these magnetized zones is then coated, as shown in FIG. 1B, with a layer (18) of the first developer, the thickness of said layer being proportional to the magnitude of the magnetic attractive force exerted by the magnetized zone onto which said layer is deposited.

Indeed, it should be noted that the force with which each of the developer particles that have been deposited on the same magnetized zone is attracted depends not only upon the magnetization value J of said zone and upon the distance (h) between each particle of said zone, but also upon the physical characteristics of said developer, such as the granulometric state and the percentage of magnetic particles of said developer. For a given developer, the magnetic force exerted on a developer particle deposited onto a magnetized zone varies directly with the magnitude of the magnetization value J. Furthermore, this magnetic attractive force decreases as the distance (h) between said particle and said zone increases, the variations of said magnetic force $F_M$ as a function of said distance (h) being as shown by the curves on the diagram of FIG. 6. The broken-line curve 81 represents the variations, as a function of (h) of the magnetic attractive force exerted by the magnetized zone A1 which has a magnetization $J_1$. Likewise, the dot-and-dash line curve (82) represents the variations, as a function of (h), of the magnetic attractive force exerted by the magnetized zone $A_2$ with a magnetization $J_2$.

Figure 6:
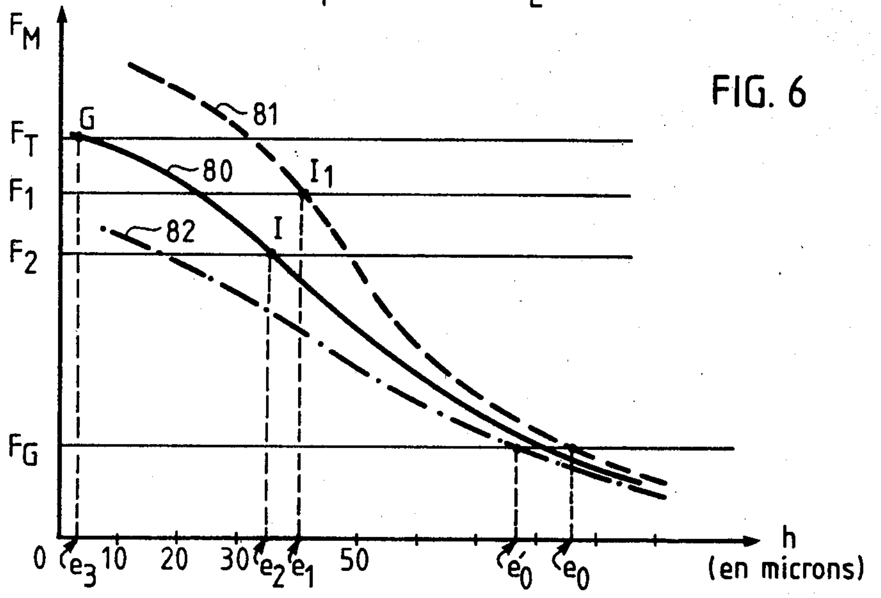
FIG. 6 shows curves illustrating the variation of the magnetic attractive force exerted by each magnetized point before and after applying the constant magnetic field utilized in the process of the invention.

FIG. 6 also shows the value $F_G$ of the gravitational force mentioned earlier, said force being exerted on each developer particle when said developer is applied to the recording element surface. Therefore, there is for each of the magnetized zones a special value of the distance (h) for which said gravitational force $F_G$ is equal to the magnetic attractive force exerted by each of these zones, said special value thus determining the thickness of the developer layer that continues to exist on said zone. Since in the example described, the magnetic force exerted at a given point by the zone A1 is greater than that exerted at said point by the zone $A_2$, the particular value $e_o$ for which the magnetic force exerted by A1 is equal to $F_G$ is greater than the value $e'_o$ for which the magnetic force exerted by A2 is equal to $F_G$. FIG. 6 shows that in the example described, $e_o$ is approximately equal to 87 microns, where $e'_o$ is approximately equal to 77 microns, said values determining the respective thicknesses of the layers (18) of the first developer which have been deposited onto the magnetized zones A1 and A2.

After the magnetized zones of the recording element have thus been coated with a first developer layer (18), the recording element (10) is then subjected to a retouching operation intended not only to dislodge residual particles of the first developer continuing to exist outside the magnetized zones of the recording element (10), but also to remove all the first developer particles on the magnetized zones which, as such as $A_2$, have the smaller of the two magnetization values $J_1$ and $J_2$. During this retouching operation, which can be performed by electrostatic or pneumatic means (suction or air blowing), each developer particle that continues to exist on the recording element surface is subjected to a constant force having a value $F_1$ exerted against the magnetic force $F_M$, which keeps each particle applied to the magnetized zone onto which it has been deposited. The value $F_1$ of said force is shown on the diagram of FIG. 6, said value $F_1$ being selected so that the ordinate line $F_1$ intersects only the curve (81). The abscissa of the point $I_1$ where the curve (81) intersects the ordinate line $F_1$ has been designated $e_1$ in FIG. 6. Thus, it can be seen that for the developer particles which have been deposited on each of the magnetized zones of stronger magnetization, such as A1, and which are located at a distance smaller than $e_1$, the magnetic force exerted by said zone is greater than the retouching force $F_1$, so that these particles will remain extant on that zone. In contradistinction, for the particles which are located at a distance greater than $e_1$ on each of the magnetized zones of stronger magnetization, the magnetic force exerted by said zone is smaller than the retouching force $F_1$, so that these particles will be eliminated from said zone. Consequently, a first developer layer with a thickness practically equal to $e_1$ will still be extant on each of the magnetized zones of stronger magnetization (such as A1). As for the first developer particles which have been deposited onto each of the magnetized zones of weaker magnetization (such as A2), they will be totally eliminated from said zones inasmuch as the magnetic force exerted by each of these zones is always smaller than the retouching force $F_1$. Under these conditions, only the magnetized zones of stronger magnetization (such as A1) will appear coated with a first developer layer having a thickness of $e_1$, as can be seen in FIG. 1c.

Upon completion of the retouching operation described above, a second powdery developer whose shade is that of the other of the two selected colors, that is, black in the example described, is deposited onto the surface of the recording element. The second developer is deposited under the same conditions as those which have been described for the first developer so that, at the end of the depositing operation, ecah of the magnetized zones of the recording element (10) is coated with a second developer layer (19) as shown in FIG. 1D. On the magnetized zones having a stornger magnetization, such as zone A1, said layer (19) is thus superimposed on the layer (18) of the layer (18) of the first developer. Thereupon, the recording element is subjected to a second retouching operation similar to the one previously described, but with a constant force $F_2$ smaller than the force $F_1$ of the first retouching operation. This second retouching operation is performed within a constant magnetic field having a value (H) and produced by a magnetic-field-generating device (56) of known construction. The magnetic field (H) generated by this device (56) is oriented in a direction opposite to that of the stronger of the two magnetizations of the magnetized zones, that is, in a direction opposite to that of the magnetization $J_1$. Under these conditions, due to the effect of said magnetic field (h), the magnetization of the magnetized zones with the stronger magnetization is decreased while the magnetization of the other magnetized zones, such as zone A2, is increased. The result is a decrease in the magnetic attractive force exerted by each of the magnetized zones whose magnetization has been reduced, while there is an increase in the attractive force exerted by each of the magnetized zones whose magnetization has been increased.

The value of the magnetic field (H) is selected so that the magnetic force exerted by each magnetized zone with a weakened magnetization then becomes equal to that exerted, under the same conditions, by each magnetized zone with a stronger magnetization. The variations of said magnetic force, as a function of (h), are represented in FIG. 6 by the solid-line curve (80). In FIG. 6, $e_2$ designates the abscissa of the point I where said curve (80) intersects the ordinate line $F_2$, which is the value of the force of the second retouching operation. It can be seen in FIG. 6 that for the developer particles which have been deposited onto each of the magnetized zones and which are located at a distance greater than $e_2$, the magnetic force exerted by said zone is smaller than the retouching force $F_2$, so that these particles will be dislodged from said zone. On the contrary, for each of the particles which are located on each zone at a distance smaller than $e_2$, the magnetic force exerted by that zone is greater than the retouching force $F_2$, so that these particles will be extant on said zone. Consequently, a developer layer, practically $e_2$ thick, will be extant on each of the magnetized zones of the recording element (10). As can be seen in FIG. 6, since the thickness $e_2$ is smaller than $e_1$ mentioned above, each of the magnetized zones which initially had the strongest magnetization will appear coated with a first developer layer (18) having a thickness $e_2$, while each of the magnetized zones which initially had the weakest magnetization will appear coated with a second developer layer (19) having a thickness $e_2$. This is shown in FIG. 1E where the magnetized zone A1 is coated with a first developer layer (18) and where the magnetized zone A2 is coated with a second developer layer (19). It should, moreover, be noted that, with the exception of their color, these two developers have practically the same physical properties, especially the same granulometric state, the same saturation induction, the same density, and the same melting point.

Following the coating of the magnetized zones of the recording element (10) with two developer layers in the manner just described, a paper strip (20) intended to be printed in the immediate vicinity of that recording element is introduced in the manner shown in FIG. 1F, and said recording element is subjected to the action of a constant magnetic field produced by a magnetic field generator (21) similar to the generator (56) mentioned above. By "immediate vicinity" it is meant that the distance between the paper strip (20) and the surface of the recording element (10) is 1 millimeter at the most. The magnetic field H generated by the generator (21) has the same amplitude (H) and the same direction as the field produced by the generator (56) so that, under the effect of that field, the magnetic force exerted by each of the magnetized zones of the recording element (10) varies as a function of the distance (h) in the manner shown in FIG. 6 by the solid-line curve (80). While the recording element (10) thus remains subjected to the action of the magnetic field produced by the generator (21), the paper strip (20) is made to contact said recording element, whereupon each of the particles of either developer which is on said element is subjected to the action of a so-called transfer force, which attracts each of these particles toward the paper strip and thus transfers to that strip the near totality of these particles. This transfer operation can, moreover, be achieved either by pressing the paper strip (20) against the recording element (10) or by using electrostatic means. However, it is assumed that, regardless of the means employed to perform this transfer operation, the transfer force utilized in the course of this operation maintains a constant value $F_T$. The value $F_T$ of this force is shown on the diagram of FIG. 6. It should be noted that the value $F_T$ of this transfer force is selected such as to allow the totality or near totality of the particles present on the element (10) to be transferred to the paper strip (20). It is, of course, acceptable to use a transfer force whose value $F_T$ is such that the ordinate line $F_T$ is located above the curve (8) and does not intersect that curve. Under these conditions, all the developer particles are transferred to the paper strip (20). However, in a preferred embodiment of the process of the invention, the value $F_T$ of the transfer force is selected so that the ordinate line $F_T$ intersects the curve (80) mentioned above at a point G having an abscissa $e_3$ close to zero. It is assumed, for example, that the abscissa $e_3$ of said point G is approximately 3 microns. Under these conditions, almost all the developer particles which were on the recording element (10) are transferred to the paper strip (20) so that upon completion of the transfer operation a developer layer with a practically negligible thickness $e_3$ will be exant on each of the magnetized zones of the recording element (10). This procedure prevents the transfer to the paper strip (20) of the first developer residual particles which, following the first retouching operation, would not have been dislodged from the magnetized zones with a weaker The developer layers which have thus been transferred to the paper strip (20) are then subjected to a fixing operation, designed to affix these layers permanently onto the paper. This operation is performed at a temperature which enables the two developers consituting said layers to attain at least a viscous state. This temperature can be selected such as to cause the two developers to melt without running the risk of burning or carbonizing the paper. Advantageously, the developers employed can be of the same type as those described in French Pat. application No. 2,478,830 filed by the applicant on March 20, 1980 corrresponding to U.S. application Ser. No. 154,076 of G. Gerriet et al., filed May 28, 1980, and assigned to the assignee of the present invention. These developers have the advantage of melting at a temperature lower than 140° C. Under these conditions, following this fixing operation, each of the piles (34) produces on the paper a pinpoint spot having the shade of the second developer, that is, black in the example described, while each of the piles (35) produced on the paper a pinpoint spot having the shade of the first developer, that is, red in the example described.

FIG. 2 shows a magnetographic printing machine for producing a two-color printing according to the printing process described herein. The machine shown in this Figure comprises a magnetic recording element in the shape of a magnetic drum (10) similar to that described and shown in the French Pat. No. 2,402,921 noted above, said drum being driven by an electric motor (25) in the direction of arrow R. The magnetization of the magnetic layer of said drum is ensured by a group of n magnetic heads 13-1 through 13-n arranged side by side and aligned parallel to the axis of rotation of the drum. Said heads, of the type shown in FIG. 3, are excited selectively by electric pulses emitted by pulse generator (26) and applied to the windings of said heads by means of a current-calibrating and reversing device (27), the structure of which is shown in detail in FIG. 4.

Figure 4:
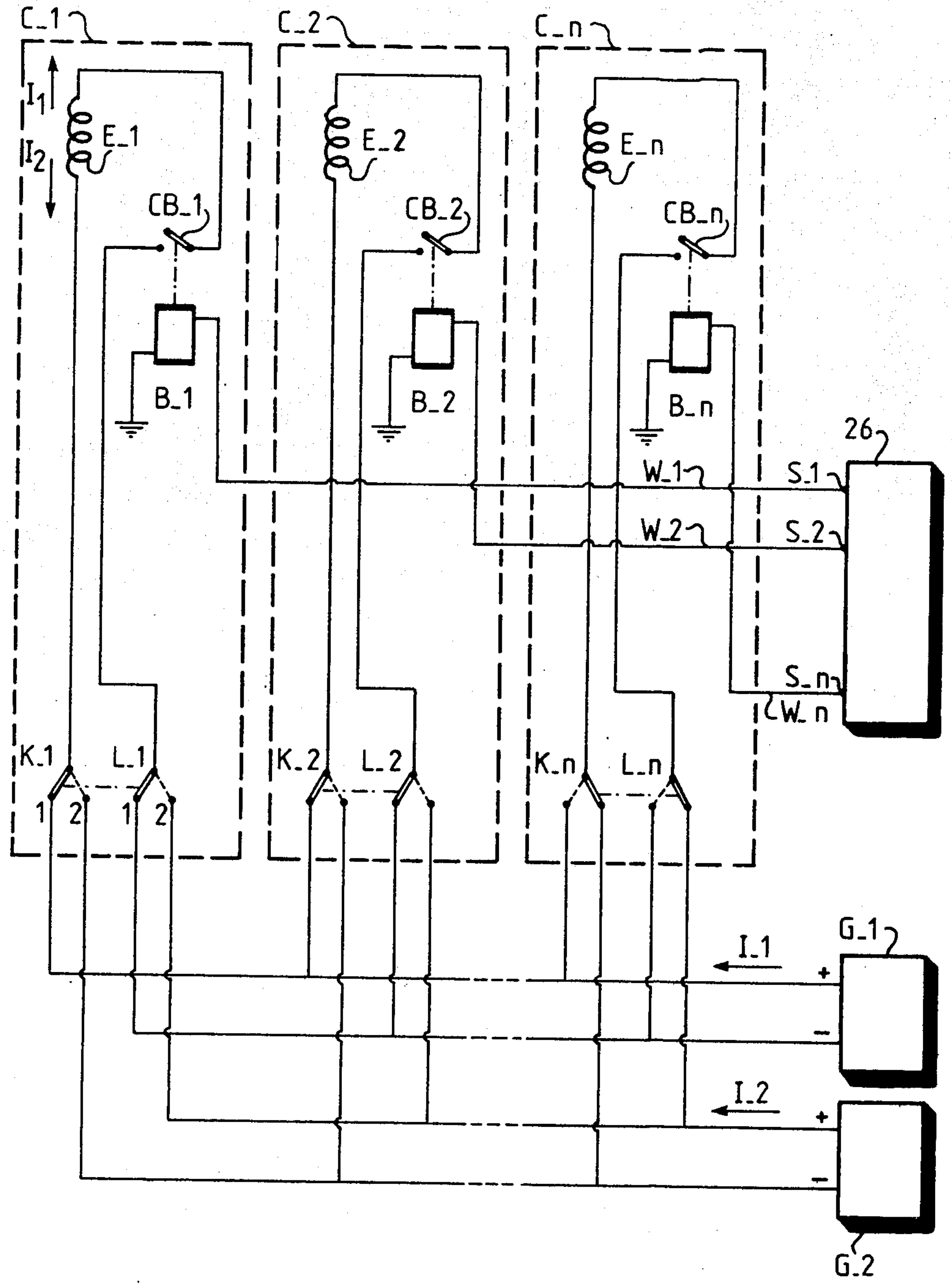
FIG. 4 shows a diagram of the electric circuit used to control the various recording magnetic heads of the machine of FIG. 2.

Now referring to FIG. 4, it can be seen that each of the respective windings El through E-n of the magnetic heads 13-1 through 13-n is connected at one end to the moving contact blade of one of n first reversing contacts K-1 through K-n and, at other end, to the moving blade of each one of n second reversing contacts L-1 through L-n by means of a corresponding one of n relay contacts CB-1 through CB-n. Each of the relay contacts CB-1 through CB-n is controlled by each one of n relay coils B-1 through B-n.

FIG. 4 shows that in the example described each of the reversing contacts K-1 through K-n and L-1 through L-n includes two positions identified by the digits 1 and 2. The position 1 of each of the reversing contacts K-1 through K-n is connected to the positive terminal (+) of a first current generator Gl, while the position 1 of each of the reversing contacts L-1 through L-n is connected to the negative terminal (−) of said first current generator G1. The position 2 of each of the reversing contacts K-1 through K-n is connected to the negative terminal (−) of a second current generator G2, while the position 2 of each of the reversing contacts L-1 through L-n is connected to the positive terminal (+) of said second current generator G2.

FIG. 4 shows that the moving contact blades of the reversing contacts K-1 through Kn are coupled mechanically so that they can be placed simultaneously in the same position. The same is true for the moving contact blades of the reversing contacts K-2 and L-2, . . ., K-n and L-n. As can be seen in FIG. 4, the relay coils B-1 through B-n can be energized by electric pulses supplied at the corresponding outputs S1 through Sn of the pulse generator (26), each of said coils B-1 through B-n being connected for that purpose to each one of outputs S1 through Sn by means of a corresponding one of n conductors W1 through Wn.

The structure of the pulse generator (26) will not be described here, since this type of structure is known. It will be assumed here that, in the example described, the structure of pulse source (26) is similar to that of the recording control device shown in French Pat. No. 2,443,335 corresponding to U.S. application Ser. No. 089,039 of J. Eltgen, et al., filed Oct. 29, 1979, and assigned to the assignee of the present invention, now U.S. Pat. No. 4,312,045.

Where the machine of FIG. 2 is used to print characters made up of points located inside a rectangular matrix comprising seven lines and five columns, for the line of said matrix extending in a direction parallel to the axis of rotation of the drum (10), the latent magnetic image required for printing a character is obtained by exciting selectively five adjacent heads chosen from the group of magnetic heads 13-1 through 13-n seven different times. Said excitation is effected by means of pulses delivered at successive instants $t_1$, $t_2$, $t_3$, $t_4$, $t_5$, $t_6$ and $t_7$ at five of the corresponding outputs S1 through Sn of the pulse generator (26). Thus, for example, in order to form the latent magnetic image required for printing the character G by means of the magnetic heads 13-1 through 13-5, the pulse generator (26) delivers at instant $t_1$ a pulse at each of its outputs S2 through S4; at instant $t_2$ a pulse at each of its putputs S1 and S5; at instant $t_3$ a pulse at its output S5; at instant $t_4$ a pulse at each of its outputs S1, S2, S3 and S5; at instant $t_5$ a pulse at each of its outputs S1 and S5; at instant $t_6$ a pulse at each of its outputs S1 and S5 and, finally, at instant $t_7$ a pulse at each of its outputs S2 through S4.

Figure 5:
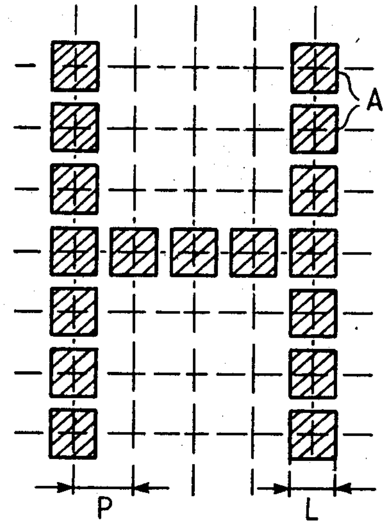
FIG. 5 is a view of the arrangement of the magnetized points which have been produced on the recording element to form the latent magnetic image of a character.

This can perhaps be best visualized by drawing a rectangular matrix of seven lines and five columns, is shown in FIG. 5, labeling the lines $t_1$ through $t_7$ from the top to bottom and the columns S1 to S5 and shading a zone area for each delivered pulse on the appropriate time line and column.

The reversing contacts K-1 through K-n and L-1 through L-n and the current generators G1 and G2 are arranged to determine the orientation direction and the amplitude of the magnetizations of the magnetized zones on the drum (10), said direction and said amplitude conditioning the color of the pinpoint spot which will be produced subsequently on the paper by each of the magnetized zones. To accomplish this, the first reversing contacts K-1 through K-n, the second reversing contacts L-1 through L-n, the relay contacts CB-1 through CB-n, and the windings E-1 through E-n of the magnetic heads are distributed as shown in FIG. 4 so as to form n circuit portions C-1, C-2, . . . C-n, each associated with a corresponding one of the n heads 13-1 through 13-n, each of said portions comprising, in series, a corresponding one of the first reversing contacts K-1 through K-n, a corresponding of the windings E-1 through E-n, a corresponding one of the relay contacts CB-1 through CB-n, and a corresponding one of the second switches L-1 through L-n.

When the two reversing contacts of the same circuit portion are placed in position 1, the current flowing through the winding of the head associated with said circuit portion during all the time when the relay contact, which is in series with said winding, is closed, is the current generated by the generator G1. Said current having an intensity $I_1$, then flows through said winding in the direction indicated by the arrow $I_1$in FIG. 4. It is assumed in the example described that in the case where the current flowing through said winding has an intensity $I_1$ and has the direction indicated by said arrow $I_1$, the magnetization of the magnetized zone thus porduced on the drum (10) by the head equipped with said winding is oriented in the direction indicated by the arrow $J_1$ in FIG. 1A and has the same amplitude as that shown in FIG. 1A. Likewise, in the case where the two reversing contacts of said circuit portion are placed in position 2, the current flowing through said winding of the head associated with said circuit portion during all the time when said relay contact which is in series with said winding is closed, is the current generated by the generator $G_2$. Said current, having an intensity $I_2$ smaller than the $I_1$ of the current porduced by the generator $G_1$, then flows through said winding in the direction indicated by the arrow $I_2$ in FIG. 4. It is assumed in the example described that in the case where the current flowing through that winding has an intensity $I_2$ and has the direction indicated by said arrow $I_2$, the magnetization of the magnetized zone thus produced on the drum (10) by the head equipped with said winding is oriented in the direction indicated by the arrow $J_2$ in FIG. 1A and has the same amplitude as that shown in said FIG. 1A.

Considering that the intensity and the direction in which the current flows through each winding are determined by the position of the reversing contacts of the circuit portion associated with said winding, it can be seen that, by properly positioning the reversing contacts K-1 through K-n and L-1 through L-n before the pulse generator (26) delivers impulses at these outputs, magnetized zones with a magnetization oriented in the desired direction and having the desired amplitude will be obtained on the drum (10) when these impulses are emitted. Thus, for example, if it is desired to obtain on the drum (10) by means of the heads 13-1 through 13-5, a latent image having the configuration of a character such as the one shown in FIG. 5, said latent image being such that the magnetized zones producing the same have a magnetization oriented in the direction of the arrow $J_1$, it suffices to place the reversing contacts K-1 through K-5 and L-1 through L-5 in position 1 prior to energizing the magnetic heads 13-1 through 13-5. If, on the other hand, it is desired that these magnetized zones have a magnetization oriented in the direction of the arrow $J_2$, it suffices to place the reversing contacts K-1 through K-5 and L-1 through L-5 in position 2 prior to energizing the heads 13-1 through 13-5. The positioning of the reversing contacts K-1 through K-5 and L-1 through L-5 in either position 1 or 2 can be accomplished, either manually by the operator prior to any printing operation, or fully automatically, in which case the reversing contacts K-1 through K-n and L-1 through L-n are controlled by operating means of a conventional nature energized by the same control unit controlling the operation of the pulse generator (26). It should be noted that, depending upon the case and the application, some of the reversing contacts K-1 through K-n and L-1 through L-n can be placed in position 2, while the other reversing contacts are placed in position 1 which, during the printing of a line of characters, for example, enables characters to be obtained which are printed in one of the two colors, while the other characters of said line are printed in the other color.

It should be mentioned that the current-calibrating and reversing means (27) shown in FIG. 2 in the example described consists of an assembly that is made up of a group of relay coils B-1 through B-n and their contacts CB-1 through CB-n, reversing contacts K-1 through K-n and L-1 through L-n, and generators G1 and G2, all these elements being interconnected in the manner shown in FIG. 4.

Now, reverting to FIG. 2, it will be seen that the printing machine designed according to the teachings of the invention also includes a first applicator means (40) of known construction, which enables particles of a first powdery developer contained in a tank (49) to be applied to the surface of the drum (10). In the example described, it is assumed that the color of said first developer is red. This first applicator means (40) is designed to deposit on each of the magnetized zones of the drum (10) a first developer layer approximately 87 microns thick for the magnetized zones of magnetization $J_2$. Preferably, this applicator means is of the same type as those described and shown in French Pat. Nos. 2,408,462 corresponding to U.S. Pat. Nos. 4,246,588 and 2,425,941 corresponding to U.S. Pat. No. 4,230,069, said device including on the one hand a rotating magnetic element which brings the developer particles of the tank (49) particles near the surface of the drum and, on the other, a deflector inserted between said element and the drum so as to form a trough in which are accumulated the particles collected by said deflector. Said deflector leaves between itself and the drum a very small opening of about 1 millimeter, through which pass the particles which have come to be applied to the surface of said drum. The magnetized zones of the drum (10), which have thus been coated with a first developer layer, then move past a first retouching device 41 designed on the one hand to dislodge the developer particles on the drum (10) outside the magnetized zones and, on the other hand, to eliminate the first developer particles which have been deposited on the magnetized zones of magnetization $J_2$. This retouching device (41) may be electrostatic or pneumatic. In the example described, the retouching device (41) is assumed to be of the type described and shown in French Pat. No. 2,411,435 corresponding to U.S. application Ser. No. 965,412 of J. J. Binder, filed Nov. 25, 1980, and assigned to the assignee of the present invention, now abandoned in favor of continuation application Ser. No. 210,312, filed Nov. 12, 1980, now U.S. Pat. No. 4,348,684, and which is adjusted so as to leave on the zones of magnetization $J_1$ only a first developer layer approximately 40 microns thick. The magnetized zones of the drum (10) which have moved past the retouching device (41) then move past a second applicator means (42) of a type similar to that of the first applicator means, said second applicator means enabling the depositing onto the drum (10) of particles from a second powdery developer, which is black in the example described and is stored in a tank (50). Said second applicator means (42) is designed on the one hand to deposit onto each of the magnetized zones of magnetization $J_2$ of the drum (10) a layer of second developer approximately 77 microns thick and, on the other hand, to deposit a second layer of the second developer onto each of the already deposited first developer layers, said second layer being about 50 microns thick. Since in the example described the thickness of the first developer layer is practically 40 microns, the total thickness of these two layers is therefore about 90 microns. The magnetized zones of the drum (10) which are then coated with these developer layers then move past a magnetic field generator (56) and past a second retouching device (43) similar to the retouching device (41). In the example described, the magnetic field generator (56) consists of a permanent magnet and is arranged in such fashion that the magnetic field it generates is oriented in the direction opposite to that of the magnetization $J_1$. This device (56) is also designed in such a way that the amplitude (h) of said magnetic field corresponds to the conditions described in detail above. The second retouching device (43), together with said magnetic field generator (56), enables the thickness of the developer layers which are then present on the magnetized zones of the drum (10) to be reduced, and it is adjusted so that, following the retouching operation effected by said device (43), each of the drum-magnetized zones is coated with a layer practically 35 microns thick, said layer then comprising only first developer particles whenever it is present on a zone of magnetization $J_1$ and only second developer particles whenever it is present on a zone of magnetization $J_2$.

Figure 7:
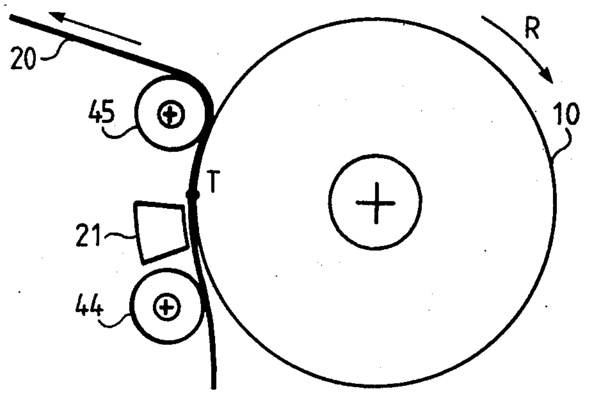
FIG. 7 shows the structure of the transfer station of the machine shown in FIG. 2.

The magnetized zones of the drum (10) which have undergone said second retouching operation are then brought to the immediate vicinity of a paper strip (20) to which shall be transferred the near totality of the two developers which have deposited onto the surface of the drum (10). To do this, the machine in FIG. 2 includes a transfer station which, in the example described, is comprised of one roller (45), through which passes the paper strip (20). The roller (45) is a pressure roller which enables the paper strip (20) to be applied to the drum (10) with a force of a given value generally not exceeding 600 newtons per linear meter. In the example described, said force has been adjusted by means of springs not shown in the drawings for reasons of simplification. In the preferred embodiment shown in FIG. 7, the transfer station also includes a guide roller (44) which is upstream of the roller (45) in relation to the unwinding direction of the drum and to the paper strip and which enables the paper strip (20) to be brought to the immediate proximity of the drum (10) surface just prior to the application of said strip to said surface. FIG. 7 indeed shows that the point T where the strip (20) comes into contact with the drum (10) is located between the rollers (44) and (45). The machine shown in FIG. 2 also includes a second magnetic field generator (21) which is placed on the level of the transfer station, that is, in the immediate vicinity of the roller (45). In the example described, said generator (21) consists of a permanent magnet. However, it should be noted that this magnet may be replaced by any other equivalent means, e.g., a magnetic induction coil energized by a direct current. Said second generating device (21) is so designed that the magnetic field (H) it produces is oriented in the same direction and has the same amplitude as the magnetic field generated by the first magnetic field generator (56). Under these conditions, during the transfer the magnetization intensities of the magnetized zones subjected to the action of said magnetic field all assume the same value, which enables layers all having the same thickness to be transferred to the paper strip (20). Preferably, the force with which the roller (45) presses the paper strip (20) against the drum (10) is adjusted so that the first and second developer layers which were deposited onto the magnetized zones of the drum (10) are transferred in near totality to the paper strip (20).

In the embodiment shown in FIG. 7, the second magnetic field generator (21) is fitted preferably between the guide roller (44) and the above-mentioned point T, but close to said point T. It has been found that such an arrangement improves the efficiency of the transfer and the quality of the image produced on the paper during said transfer.

The machine shown in FIG. 2 also includes a developer fixing means (46) under which passes the paper strip (20), once the just-described transfer operation is completed. Said fixing means (46), composed of an electrically heated element in the example described, is designed to fix permanently the developers which have been transferred to the paper strip (20). It should be noted that said fixing means (46) is adjusted so that these developers are subjected to any fusion. There is no burning or even deterioration occurring on the paper strip (20), the melting temperature of said developers being lower than 140° C. in the example described, so that only a softening of developer occurs to ensure fixation. Under these conditions, each pile (such as 34) produces, while cooling on the paper, a pinpoint spot having the shade of the second developer, while each pile (such as 35) forms, while cooling on the paper, a pinpoint spot having the shade of the first developer.

The machine shown in FIG. 2 also includes a cleaning device which consists of a brush (47) in the example described to ensure the cleaning of the parts of the drum surface which have moved past the transfer station. Following this cleaning, said parts move past the latent magnetic images carried by said parts, so that said parts are again capable of being magnetized when It will be understood, of course, that while particular embodiments of the invention have been shown, the invention is not limited thereto since many modifications may be made and it is, therefore, contemplated to cover by the appended claims any such modifications as fall within the true spirit and scope of the invention.

I claim:

1. A magnetic printing process for obtaining on a carrier an image in two preselected colors, comprising the steps of:

magnetizing the surface of a recording element in a direction perpendicular thereto so as to produce a group of magnetized points having magnetization intensities of different amplitudes and of opposite magnetic polarities, the magnetized points being intended to produce images or parts thereof which, must appear on the carrier in one of said colors all having magnetization intensities of the same amplitude $J_1$ and oriented in the same direction, the magnetic polarity of said points being opposite to that of the other magnetized points, said other magnetized points all having magnetization intensities of the same amplitude $J_2$, such that $J_2 < J_1$;

then depositing on said surface a first powdery developer whose shade is that of the first of said colors;

eliminating said first developer from said surface, with the exception of the magnetized points whose magnetization intensity is equal to $J_1$;

depositing onto said surface a second powdery developer whose shade is that of the second of said colors;

eliminating partially said second developer from said surface, while subjecting the latter to the action of a constant magnetic field oriented in a direction opposite to the magnetization intensity $J_1$, the value of the amplitude of said magnetic field being such that the magnetization intensities of the magnetized points are modified and assume practically the same value, so that said second developer is eliminated from said surface, with the exception of the magnetized points whose magnetization intensity is equal to $J_2$, each of the latter points thus being coated with a single layer of said second developer, while each of the other magnetized points is coated with a single layer of said first developer; and finally, effecting a transfer of said developer layers onto the print carrier.

2. The printing process as set forth in claim 1, wherein the transfer of the developer layers to the print support is effected in the presence of a second magnetic field having the same direction and the same amplitude as the first magnetic field applied during the steps of eliminating the second developer.

3. A magnetographic printing machine for obtaining on a carrier an image in two preselected colors comprising a recording element (10) having a magnetic recording surface, a plurality of magnetic heads (13-1 through 13-n) connected to be controlled by electric pulses and to magnetize said recording surface in response to said pulses in a direction perpendicular to said surface so as to produce thereon a group of magnetized points (A) which constitute a latent magnetic image, drive mechanism (25) adapted to bring about a relative displacement between the recording element and the magnetic heads, a pulse generator (26) connected to apply its electric output pulses selectively to said heads, an applicator means (40) for depositing a powdery developer onto said recording surface, said developer remaining applied only to the magnetized points of said surface in order to produce a powder image, a transfer station (41) for transferring said powder image to a print carrier (20), said first developer containing particles whose shade is one of the two preselected colors;

current-calibrating and reversing means (27) disposed between the magnetic heads (13-1 through 13-n) and the pulse generator (26) in order, on the one hand, to selectively reverse the current direction of the generator output pulses and, on the other, to adjust said pulses selectively to one of two values of predetermined amplitude and thus to produce on the recording surface a latent magnetic image whose magnetized amplitudes exhibit magnetization intensities of different amplitudes and of opposite magnetic polarities, the magnetized points adapted to produce images or parts thereof which, on the carrier, must appear in one of said colors all having magnetization intensities of the same amplitude $J_1$ and in the same direction, the magnetic polarity of said points being opposite to that of other magnetized points, said other magnetized points all having magnetization intensities of the same amplitude $J_2$, such that $J_2 < J_1$;

a first retouching means (41) located, with respect to the direction of movement of the surface, downstream of said applicator means (40) and designed to dislodge said first developer from the magnetized points whose magnetization intensity is less than $J_1$;

a second applicator means (42) located between the transfer station (45) and the first applicator means (40) designed to deposit a second powdery developer onto said recording surface, said second developer containing particles whose shade is that of the other of said colors, said second developer remaining applied only to the magnetized points of said surface; and a second retouching means (43) downstream of said second applicator means (42) and comprising a magnetic field generator (56) to apply a constant magnetic field to said recording surface, said field being oriented in a direction opposite to the magnetization intensity $J_1$, the amplitude of said field being designed to modify the amplitudes of the magnetization intensities of the magnetized points and to render them practically equal when said magnetized points move past said second retouching means (43) so that, following said passage, each of the magnetized points, whose magnetization intensity was equal to $J_2$, is coated with a single layer of the second developer, while each of the magnetized points, whose magnetization intensity was equal to $J_1$, is coated with a single layer of the first developer, both developers thus forming a powder image in two colors on the recording surface.

4. The printing machine as set forth in claim 3, wherein the magnetic field generator (56) consists of a permanent magnet.

5. The printing machine as set forth in claim 3 further comprising a second magnetic field generator (21) arranged on the level of the transfer station (45) in order to apply a constant magnetic field to the recording surface during its movement past said transfer station, said magnetic field being oriented in the same direction and having the same amplitude as the magnetic field produced by the first magnetic field generator (56).

6. The printing machine as set forth in claim 5 characterized in that the second magnetic field generator (21) consists of a permanent magnet.

7. The printing machine as set forth in claims 3, 4, 5 or 6 wherein each magnetic head comprises a winding (E) wound around a core (14), the current calibrating and reversing means (27) consisting of:

n circuit portions (C-1, C-2 . . . C-n), each associated with a corresponding one of the magnetic heads (13-1, 13-2, . . . 13-n) and each containing:

a relay contact (such as CB-1) mounted in series with the winding of the the head associated and operated by a coil (such as B-1) energized selectively by the impulses emitted by the pulse generator (26);

a firt switch (such as K-1) comprising two positions (1,2) and a moving contact blade connected to one of the ends of the assembly formed by said winding (E-1) in series with said relay contact (CB-1);

and a second switch (such as L-1) comprising two positions (1,2) and a moving contact blade connected to the other end of the assembly formed by said winding (E-1) in series with said relay contact (CB-1), said switch being coupled to the first switch so that the moving contact blades of said two switches assume identical positions; and two current generators (G1, G2), the first (G1) of said current generators having its positive (+) terminal connected to the first (1) of the two positions of each of the n first switches (K-1 through K-n) and its negative (−) terminal connected to the first (1) of the two positions of each of the n second switches (L-1 through L-n), the second (G2) of said current generators having its positive (+) terminal connected to the second (2) of the two positions of each of the n second switches (L-1 through L-n) and its negative (−) terminal connected to the second (2) of the two positions of each of the n first switches (K-1 through K-n), each of said two generators being designed to provide, when the relay contacts (CB-1 through CB-n) are selectively closed in response to the impulses emitted by the pulse generator (26), one of the two respective intensity currents $I_1$, $I_2$, said intensities $I_1$ and $I_2$ being adjusted to bring about the production, in the recording element, of respective magnetized points of magnetization $J_1$ and $J_2$.

8. The printing machine as set forth in claims 5 or 6 wherein the recording element is a magnetic drum (10), the transfer station (34) includes, on the one hand, a pressure roller (45) to apply the print carrier (20) against said drum and, on the other hand, a guide roller (44) fitted upstream of the pressure roller to enable said carrier to be brought into contact with said drum at a point (T) located between said two rollers, and in that the second magnetic field generator (21) is placed substantially at the level of said point.

* * * * *